(12) United States Patent
Meier et al.

(10) Patent No.: US 7,080,828 B2
(45) Date of Patent: Jul. 25, 2006

(54) CLARIFICATION BASIN MEMBRANE

(75) Inventors: Ernst-August Meier, Salzdetfurth (DE); Giancarlo Gomez-Kerber, Harst (DE); Janusz Muchorowski, Hamburg (DE); Karl-Heinz Krause, Chemnitz (DE); Gerhard Merkmann, Gotha (DE)

(73) Assignee: Phoenix AG, Hamburg (DE)

( * ) Notice: Subject to any disclaimer, the term of this patent is extended or adjusted under 35 U.S.C. 154(b) by 0 days.

(21) Appl. No.: 10/499,629

(22) PCT Filed: Dec. 14, 2002

(86) PCT No.: PCT/DE02/04590

§ 371 (c)(1),
(2), (4) Date: Jun. 22, 2004

(87) PCT Pub. No.: WO03/055809

PCT Pub. Date: Jul. 10, 2003

(65) Prior Publication Data

US 2005/0045550 A1 Mar. 3, 2005

(30) Foreign Application Priority Data

Dec. 22, 2001 (DE) .............................. 101 63 973

(51) Int. Cl.
*B01F 3/04* (2006.01)
(52) U.S. Cl. ............ 261/122.1; 261/124; 261/DIG. 70
(58) Field of Classification Search ............ 261/121.1, 261/122.1, 122.2, 124, DIG. 46, DIG. 70; 210/220
See application file for complete search history.

(56) References Cited

U.S. PATENT DOCUMENTS

| 4,500,517 | A | * | 2/1985 | Luss ........................... 424/711 |
| 5,034,164 | A | | 7/1991 | Semmens |
| 5,182,317 | A | | 1/1993 | Winters et al. |
| 6,171,496 | B1 | * | 1/2001 | Patil ........................... 210/484 |
| 6,345,812 | B1 | * | 2/2002 | Jager et al. .............. 261/122.1 |
| 6,540,915 | B1 | * | 4/2003 | Patil ...................... 210/500.27 |
| 6,543,753 | B1 | * | 4/2003 | Tharp ....................... 261/122.2 |
| 6,635,305 | B1 | * | 10/2003 | Sirejacob .................... 427/2.1 |
| 6,712,976 | B1 | * | 3/2004 | Manzone .................... 210/668 |
| 6,802,891 | B1 | * | 10/2004 | Kritzler ....................... 95/285 |
| 2003/0038074 | A1 | * | 2/2003 | Patil ...................... 210/321.74 |

FOREIGN PATENT DOCUMENTS

| DE | 32 24 177 A1 | 12/1983 |
| DE | 295 13 922 | 2/1996 |
| EP | 0322866 A2 | 7/1989 |
| JP | 58193703 | 11/1983 |

* cited by examiner

*Primary Examiner*—Scott Bushey
(74) *Attorney, Agent, or Firm*—Collard & Roe, P.C.

(57) ABSTRACT

A clarification basin membrane made of a polymeric, in particular, elastomeric material, which is rendered gas-permeable by a perforation, whereby a permanent gas permeability is effected by mixing a wast water biologically active inhibitor with the polymeric material.

9 Claims, 1 Drawing Sheet

CLARIFICATION BASIN MEMBRANE

CROSS REFERENCE TO RELATED APPLICATIONS

Figure 1:
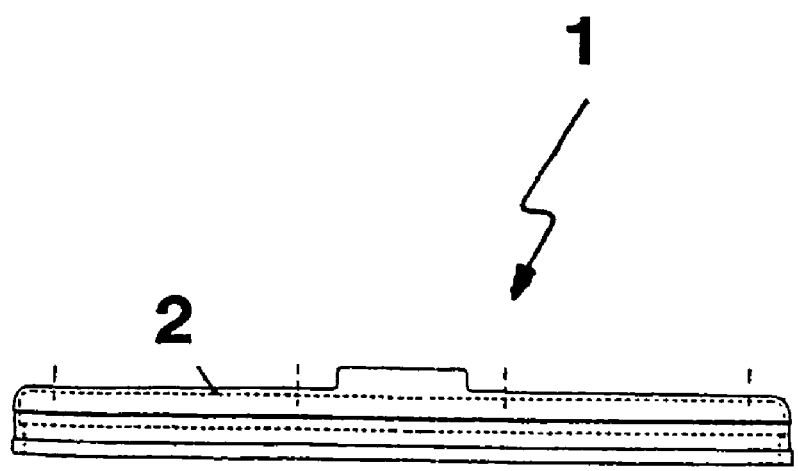

Applicants claim priority under 35 U.S.C. §119 of German Application No. 101 63 973.2 filed on Dec. 22, 2001. Applicants also claim priority under 35 U.S.C. §365 of PCT/DE02/04590 filed on Dec. 14, 2002. The international application under PCT article 21(2) was not published in English.

The invention relates to a settling basin membrane made of polymer, particularly elastomer material, which is gas-permeable by means of a perforation (e.g. slit perforation).

The multi-stage purification of municipal and industrial waste water in settling basins of sewage treatment plants ends with a biological stage. In this purification stage, settling basin membranes are used (DE 295 13 922 U1) for the introduction of gas (air, air enriched with oxygen, oxygen).

A sufficient introduction of oxygen now has to be assured for the settling basins, since an oxygen deficiency causes the microorganisms (bacteria) to die. The holes or slits in the membranes therefore become clogged with dead bacteria. The required introduction of oxygen is therefore no longer present. Algae can also have a negative influence on the gas permeability of the membranes.

For the purpose of eliminating the aforementioned disadvantages, the new settling basin membrane according to the characteristics of claim 1 is now characterized in that an inhibitor that is biologically active for waste water is added to the polymer material.

The inhibitor is particularly difficult to dissolve in water. In this manner, the inhibitor is prevented from being washed out.

Furthermore, the inhibitor is preferably an inhibitor system formed by at least two inhibitor types. In this connection, the inhibitor system particularly comprises a microorganism inhibitor and an algae inhibitor.

The following are used as inhibitors:
2,4,4'-trichloro-2'-hydroxy-diphenyl ether, particularly as a microorganism inhibitor;
N'-tert. butyl-N-cyclopropyl-6-(methylthio)-1,3,5-triazine-2,4-diamine, particularly as an algae inhibitor.

Within the scope of a particularly advantageous variant, a carrier material that is charged with the inhibitor or inhibitor system is mixed into the polymer material, specifically with the formation of a corresponding adduct. The carrier material is, in particular, a molecular screen in the form of a metal-aluminum-silicate of the following formula:

$Me_n[(AlO_2)_x.(SiO_2)_y]$ with or without water of crystallization, particularly $Na_{86}[(AlO_2)_{86}.(SiO_2)_{106}]$ with or without water of crystallization A metal-aluminum-silicate that is frequently used is:

$Na_{86}[(AlO_2)_{86}.(SiO_2)_{106}].276\ H_2O$

In this connection, the water of crystallization is dehydrogenated, either in whole or in part. The spaces for water of crystallization that become free are then filled with the inhibitor or inhibitor system, by means of charging. The corresponding adduct is then effective.

The inhibitor or the inhibitor system is distributed essentially uniformly in the polymer material. Its proportion with reference to the total mass of the polymer material is, in particular, 0.1 to 5.0 wt.-%.

The polymer material is low in plasticizer, preferably free of plasticizer, particularly again in combination with the following material variants:
The polymer material is a vulcanized rubber mixture, specifically on the basis of an ethylene-propylene-diene mixed polymerizate (EPDM), of nitrile rubber (NBR), or silicone rubber, each of them uncut.
The polymer material is a vulcanized rubber mixture on the basis of an EPDM/NBR blend.

With reference to the total mass of the polymer material, the proportion of the polymer or rubber or blend component is 10 to 50 wt.-%. In this connection, usual mixture ingredients such as vulcanization agents (e.g. sulfur or sulfur sources) and, in most cases, activators, fillers (e.g. carbon black), zinc oxide, as well as other additives, if necessary (e.g. agents to protect against aging), are added to the rubber.

With regard to the design, the settling basin membrane is configured as a:
plate membrane;
tube membrane; or
plate aerator membrane.

Figure 2:
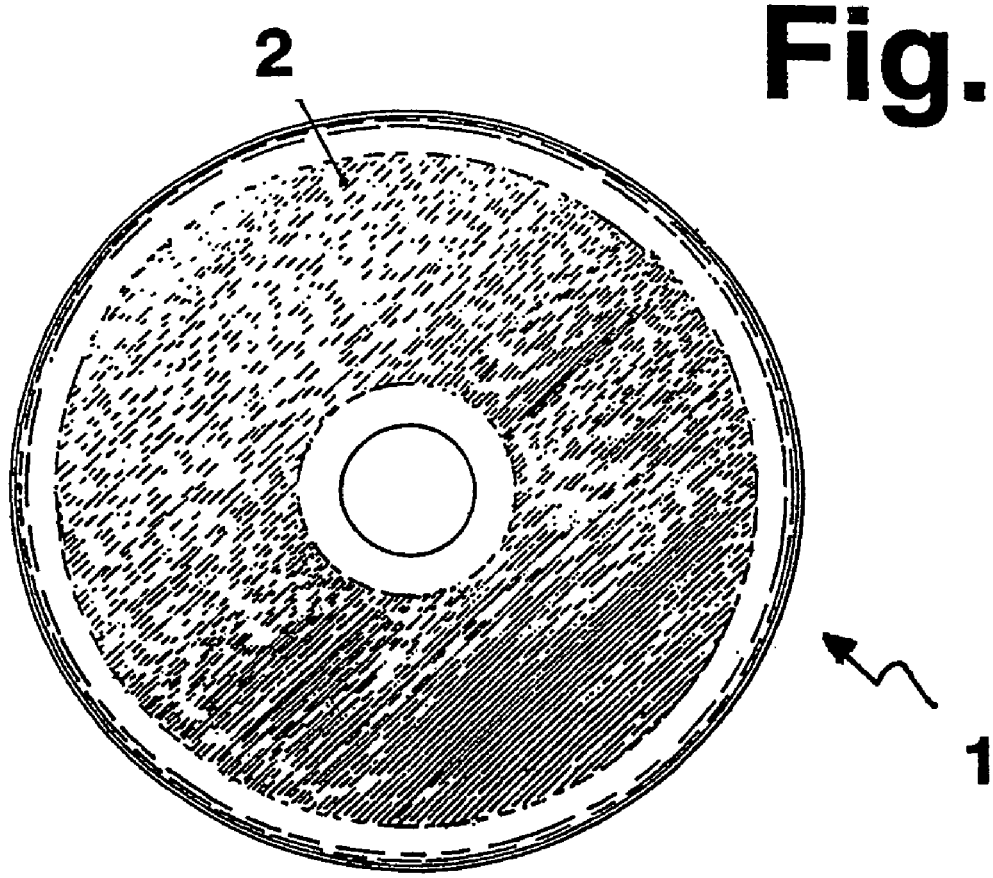

The invention will now be explained using an exemplary embodiment, making reference to schematic drawings. These show:

FIG. 1 a cross-section through a plate membrane;
FIG. 2 a top view of a plate membrane according to FIG. 1.

In connection with the figures, the following list of reference symbols applies:
1 settling basin membrane
2 perforation (slit perforation)

Since an inhibitor, particularly an inhibitor system consisting of a microorganism inhibitor and an algae inhibitor, is mixed into the polymer material, the slit perforation 2 of the settling basin membrane 1 remains gas-permeable at all times.

The invention claimed is:

1. Settling basin membrane (1) made of polymer material, which is gas-permeable by means of a perforation (2), whereby with regard to permanent gas permeability of the polymer material, an inhibitor that is biologically active for waste water is added to the polymer material, which inhibitor is difficult to dissolve in water, and is distributed in the polymer material in essentially uniform manner,
wherein
the inhibitor is an inhibitor system, formed by a microorganism inhibitor and an algae inhibitor, whereby in reference to the total mass of the polymer material, the proportion of the inhibitor system is 0.1 to 5.0 wt.-%; and that
the polymer material is a vulcanized rubber mixture, specifically on the basis of an ethylene-propylene-diene mixed polymerizate (EPDM), of nitrile rubber (NBR), or silicone rubber, each of them uncut, or on the basis of an EPDM/NBR blend, whereby with reference to the total mass of the polymer material, the proportion of the polymer or rubber or blend component is 10 to 50 wt.-%.

2. Settling basin membrane according to claim 1, wherein the inhibitor, particularly as a microorganism inhibitor, is 2,4,4'-trichloro-2'-hydroxy-diphenyl ether.

3. Settling basin membrane according to claim 1, wherein the inhibitor, particularly as an algae inhibitor, is N'-tert. butyl-N-cyclopropyl-6-(methylthio)-1,3,5-triazine-2,4-diamine.

4. Settling basin membrane according to claim 1, wherein a carrier material that is charged with the inhibitor or inhibitor system is mixed into the polymer material, specifically with the formation of a corresponding adduct.

5. Settling basin membrane according to claim 4, wherein the carrier material is a molecular screen, preferably on the basis of a sodium-aluminum silicate.

6. Settling basin membrane according to claim 1, wherein the polymer material is free of plasticizer.

7. Settling basin membrane according to claim 1, wherein it is configured as a plate membrane.

8. Settling basin membrane according to claim 1, wherein it is configured as a tube membrane.

9. Settling basin membrane according to claim 1, wherein it is configured as a plate aerator membrane.

* * * * *